(12) United States Patent
Lannerèe

(10) Patent No.: US 8,388,294 B2
(45) Date of Patent: Mar. 5, 2013

(54) THEFT-PROTECTED SCREW PART

(75) Inventor: Daniel Lannerèe, Le Perreux (FR)

(73) Assignee: ABC Umformtechnik GmbH & Co. KG, Gevelsberg (DE)

( * ) Notice: Subject to any disclaimer, the term of this patent is extended or adjusted under 35 U.S.C. 154(b) by 406 days.

(21) Appl. No.: 12/599,615

(22) PCT Filed: May 9, 2008

(86) PCT No.: PCT/EP2008/055784
§ 371 (c)(1), (2), (4) Date: Aug. 6, 2010

(87) PCT Pub. No.: WO2008/138907
PCT Pub. Date: Nov. 20, 2008

(65) Prior Publication Data
US 2010/0322741 A1    Dec. 23, 2010

(30) Foreign Application Priority Data

May 10, 2007 (DE) .......................... 10 2007 022 442
Mar. 12, 2008 (DE) .......................... 10 2008 013 895

(51) Int. Cl.
*F16B 23/00* (2006.01)

(52) U.S. Cl. ............................. 411/403; 411/910; 470/2

(58) Field of Classification Search .................. 411/910, 411/402, 403, 410, 396; 470/2
See application file for complete search history.

(56) References Cited

U.S. PATENT DOCUMENTS

| | | | |
|---|---|---|---|
| 2,133,409 A * | 10/1938 | Webb | 411/403 |
| 2,375,249 A | 5/1945 | Richer | |
| 2,538,468 A * | 1/1951 | North | 411/402 |
| 3,241,408 A | 3/1966 | McCauley | |
| 3,519,979 A * | 7/1970 | Bodenstein | 439/133 |
| 3,929,054 A * | 12/1975 | Gutshall | 411/5 |
| 4,502,825 A * | 3/1985 | Yamada | 411/5 |
| 5,395,196 A * | 3/1995 | Notaro | 411/396 |

FOREIGN PATENT DOCUMENTS

| | | |
|---|---|---|
| DE | 1 041 302 | 9/1955 |
| DE | 1 480 817 | 7/1969 |
| DE | 295 10 069 | 9/1995 |
| DE | 199 02 192 A1 | 7/2000 |
| GB | 858 088 A | 1/1961 |
| WO | WO 00/37811 A | 6/2000 |

OTHER PUBLICATIONS

International Search Report for Application No. PCT/EP2008/055784, dated Sep. 9, 2008.

\* cited by examiner

*Primary Examiner* — Flemming Saether
(74) *Attorney, Agent, or Firm* — McCarter & English, LLP

(57) ABSTRACT

The theft-protected screw part in the form of a nut or a screw has a free end region and a ring-shaped depression formed at the end region for the engagement of a wrench for rotation the screw part. Viewed from radially outside to radially inside, the depression is delimited by an outer edge, a bottom and an inner edge. The outer edge forms outer abutment surfaces and the inner edge forms inner abutment surfaces for the wrench. The screw part is composed of a main part and an insert. The main part has a protrusion, which is located within the inner edge. The insert is designed in a ring shape, has a hole for accommodating the protrusion and forms the inner abutment surfaces.

18 Claims, 6 Drawing Sheets

THEFT-PROTECTED SCREW PART

CROSS-REFERENCE TO RELATED APPLICATIONS

This application is the U.S. National Phase of International Application No. PCT/EP2008/055784, entitled "THEFT-PROTECTED SCREW PART," filed May 9, 2008, which claims priority to German Patent Application No. 10 2007 022 442.9, filed May 10, 2007, now Patent No. DE 10 2007 022 422 A1, and German Patent Application No. 10 2008 013 895.9, filed Mar. 12, 2008, now German Patent No. DE 10 2008 013 895 A1, the disclosures all of which are hereby incorporated by reference in their entireties.

FIELD OF THE INVENTION

The invention relates to a theft-protected screw part and a method for producing it.

DESCRIPTION OF RELATED ART

Such a theft-protected screw part is known from DE 199 02 192 A1 by the applicant. A similar theft-protected screw part is known from DE 1 041 302 C. Other theft-protected screw parts are described in DE 1 480 817 A and DE 295 10 069 U1.

Theft-protected screw part are used, among other things, for protecting vehicle wheels, in particular vehicle rims, against theft. Vehicle manufacturers usually deliver their vehicles with the wheels being fixed by means of normal, commercially available screws or nuts. Such wheels can and should be mounted and removed by means of normal wrenches, however, this also makes it easier for a thief to steal the wheels. Special screw parts are already known which have a specially formed head that cooperates only with a special wrench. This can provide an effective impediment to the wheel being screwed off unwantedly.

In the case of the screw part mentioned in the introduction, an annular depression is incorporated into the head. It is milled in the case of the screw part according to DE 1 041 302 C, in the case of the screw part according to DE 199 02 192 A1, the main part forms the outer edge and the bottom of the depression. The insert forms the inner stop faces for the wrench. In addition, an accommodating bore hole for the insert is provided in the main part. During assembly, the entry part is pressed into this bore hole; this is done in a predetermined orientation of the insert relative to the main part.

This latter theft-protected screw part has proven its value in principle. It was now found, however, that screw parts thus produced are always slightly heavier than the original screw part configured without theft protection. The higher weight results from the fact that, for the depression, the screw part must have a certain axial length which is larger than the axial dimension of the corresponding normal part without theft protection. The larger axial length is required because the accommodating bore hole is supposed to be located outside of the actual threaded portion if possible, because otherwise, the threaded portion would be weakened; in any case, it would be less strong than the original screw part by the vehicle manufacturer. Though a weakening of the shaft and the actual screw portion is now prevented by the greater axial length in the area of the head, the weight is increased.

BRIEF SUMMARY OF THE INVENTION

This is where the invention comes in. It has set itself the object of developing the theft-protected screw part of the type mentioned in the introduction in such a way that the weight of the screw part can be reduced to such an extent that it practically does not differ from the weight of the normal unprotected screw part anymore, while the constructional design, in particular the encoding arrangement, remains the same if possible.

This object is achieved starting with the theft-protected screw part of the type mentioned in the introduction by the main part having a projection located within the inner edge, and by the insert being formed in an annular manner, comprising a hole receiving the projection, gripping the projection and forming the inner stop faces.

In contrast to the known screw part, it is not a accommodating bore hole that is provided, rather, the main part comprises the exact opposite, namely a projection. The projection projects upwards from the bottom, towards the free end portion. In the radial direction, the projection has smaller dimensions than the inner edge. It does not form the inner edge. The inner edge is formed by the insert, which is pushed onto the projection and permanently connected with it during assembly. Different encoding arrangements are obtained by aligning one and the same insert in different ways relative to the main part, for example, 22 different angular positions can thus be provided, thus obtaining a corresponding number of encoding arrangements.

Because of the projection, the head, the shaft and the screw portion are not weakened anymore, the head can thus be shorter and the bottom closer to the screw portion, the screw part can thus be formed shorter than in accordance with the prior art. This saves weight. The weight saved is such that a total weight of the finished theft-protected screw part is obtained which corresponds to that of the normal nut or normal screw. This results in an economization with regard to mass which is beneficial for the driving behavior of the vehicle. As is known, saving mass on the wheels is even more efficient that saving mass on the car body.

The invention also relates to a method for producing such a theft-protected screw part. In the production method, the insert is fitted on the projection and fixed by means of an auxiliary tool which is largely identical in construction to the wrench used later. Thus, the angular position between the insert and the main part is fixed. The projection is now deformed in this state. Alternatively, the projection is permanently connected firmly with the projection in a suitable manner, this may be done, for example, by welding. Advantageously, an axial pressure is exerted on the projection, which is thereby widened as a whole, thus completely contacting the inner wall of the hole and becoming deformed, in particular riveted, on top, so that the projection extends over the insert like the head of a rivet. If the connection between the insert and the main part has been established, the auxiliary tool can be removed. In contrast to a tool used later, the auxiliary tool has free access to the free end of the projection, so that the latter can be processed accordingly.

In an advantageous development, the hole of the insert is cylindrical or non-circular. A round hole makes an alignment by rotation possible. A non-circular hole makes an alignment of the insert and/or a better connection of the insert and the projection possible. If the hole is configured to be non-circular, it may be, for example, formed as an internal toothing with n teeth, so that n different angular positions are predetermined mechanically. The radial outer surface of the projection may also have circular cross-sections or non-circular cross-sections. The connection already described above, which is capable of absorbing larger torques, can be obtained in the case of non-circular cross-sections. An alignment is also possible. Circular holes can be combined with a non-circular cross-section of the projection, however, the hole and the projection preferably are circular or non-circular with approximately the same form, for example, toothed, oval or polygonal.

The projection preferably has cross-sectional dimensions which are sufficiently large for it not to be easily removed or destroyed in order to negate its contribution to security. Preferably, it has cross-sectional dimensions of at least two millimeters, in particular at least four millimeters. It is also advantageous if the insert has a wall thickness of at least one millimeter, it could be too easy to destroy and remove the insert in the case of lower wall thicknesses.

Other advantages and features of the invention will become apparent from the other claims and the description below of an exemplary embodiment of the invention, which is not to be understood to be limiting, and which is explained in more detail with reference to the drawings. In the drawings:

DETAILED DESCRIPTION OF THE INVENTION

Figure 9:
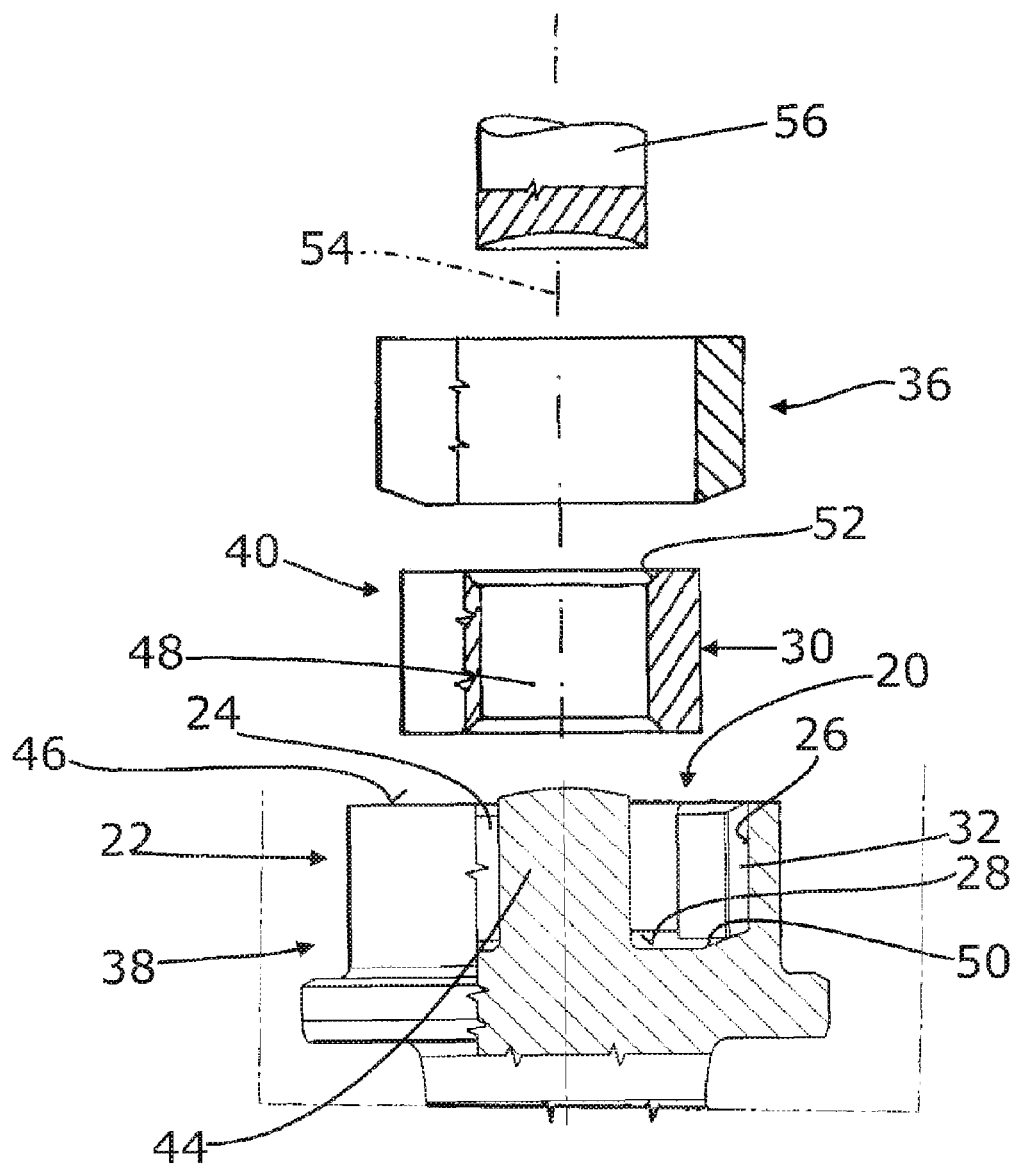
FIG. 9 is an assembly drawing with the parts according to the FIGS. 4 and 8 and other parts in a side view for illustrating the joining of the main part and insert.

The theft-protected screw part according to the exemplary embodiment has the shape of a screw. It comprises a free end portion 20 terminating a head 22 of the screw part at an axial end. A depression 24 extends from this free end portion in the axial direction, the depression being limited, as seen radially from the outside towards the inside, by an outer edge 26, a bottom 28 and an inner edge 30. It is open towards the free end portion 20. The outer edge 26 is non-circular, it comprises projections and recesses disposed in an encoded way, with inner stop faces 32 being formed by them. A wrench, which is not shown here anymore, is in engagement with these stop faces 32, 34 when it is inserted into the depression 24. Such a wrench is formed similar to the tool 36 which is shown in FIG. 9 and which can be used during the assembly.

Figure 1:
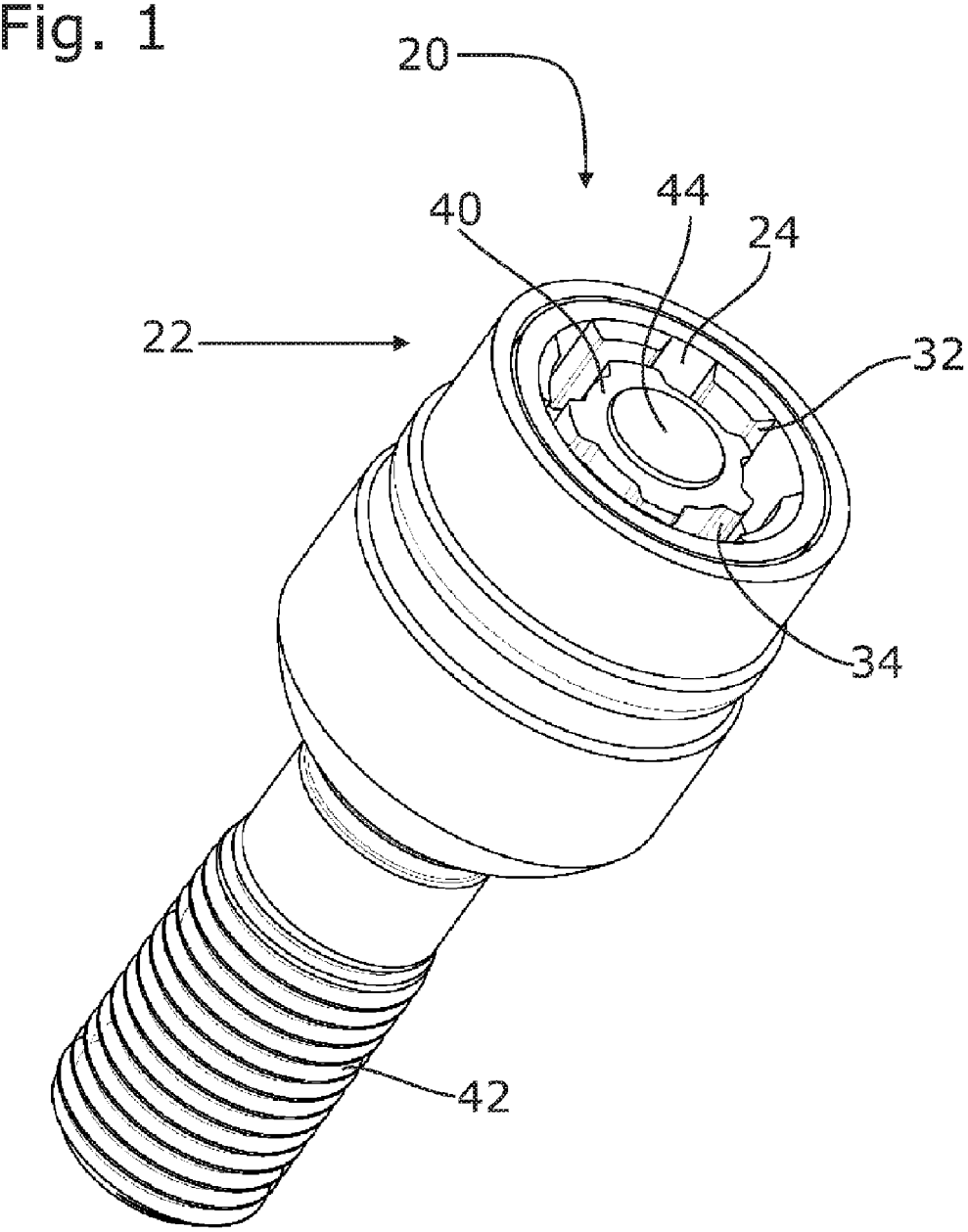
FIG. 1 shows a perspective view of the finished screw part.
Figure 2:
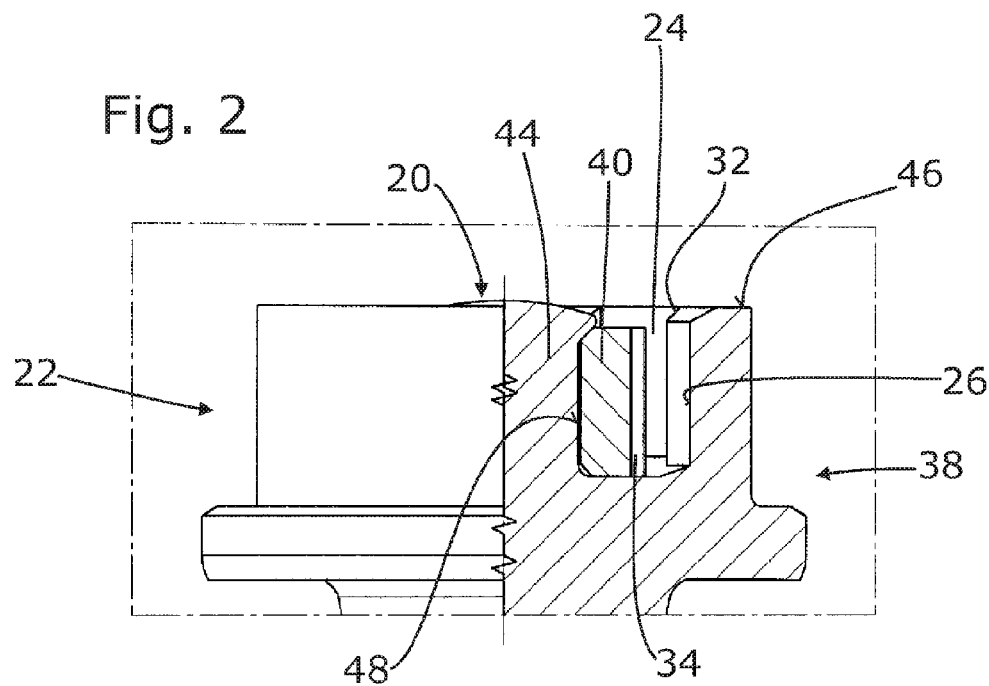
FIG. 2 shows a side view of the head portion of the screw part according to FIG. 1, executed in part as an axial section.
Figure 3:
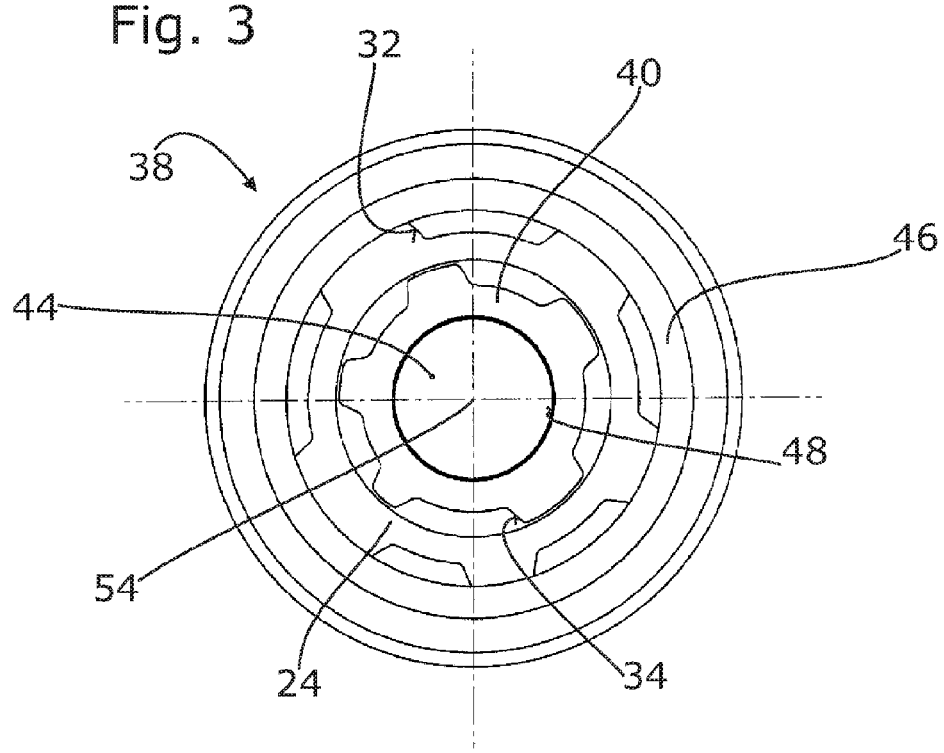
FIG. 3 shows a top view onto the free end portion of the screw part according to the preceding Figures.

The theft-protected screw part is composed of a main part 38 and an insert. The main part 38 forms a threaded portion 42 and substantial parts of the head 22, in any case, its outer contour. The main part 38 forms the outer edge 26 and the bottom 28 of the depression 24. Finally, the main part 38 forms a projection 44 extending in a radial direction. Next to the bottom 28 formed in an annular manner, it projects towards the free end portion 20. It projects axially further than an outer edge 46, both prior to being deformed (FIGS. 4 and 5), as well as after its deformation (FIGS. 2 and 3). However, it is also possible that the projection 44 projects over the outer edge 46 only prior to being deformed, or not at all.

The insert 40 is annular. It comprises a hole 48 adapted to the projection 44. The insert 40 can be pushed onto the undeformed projection 44 axially from the free end of portion 20. The axial dimension of the insert is smaller than the axial dimension of the projection 44. When the insert 40 has been pushed onto the projection 44, a part of the projection 44 remains free on top, which is mechanically deformable. However, it is also possible to form the projection 44 to be no longer than the axial dimension of the insert 40 and to connect the main part 38 and the insert 40 without riveting, such as by frictional grip.

The insert 40 forms the inner stop face 34. The orientation of this inner stop face 34 relative to the outer stop face 32 is of pivotal importance for encoding. If the hole 38 and the projection 44 are circular, the insert 40 can be aligned in any way relative to the main part 38. Once aligned, it can be connected, for example by riveting and/or widening the projection 44, so that the latter firmly contacts the inner wall of the hole 48. This will be described below with reference to FIG. 9.

Figure 10:
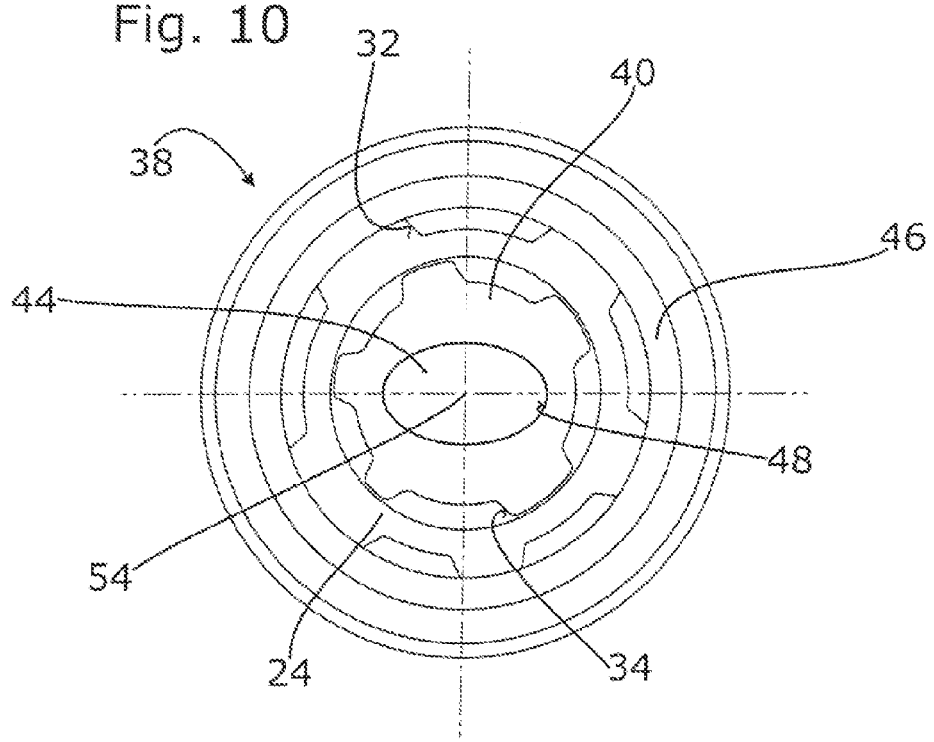
FIG. 10 shows a top view onto the free end portion of a screw part according to another embodiment.
Figure 11:
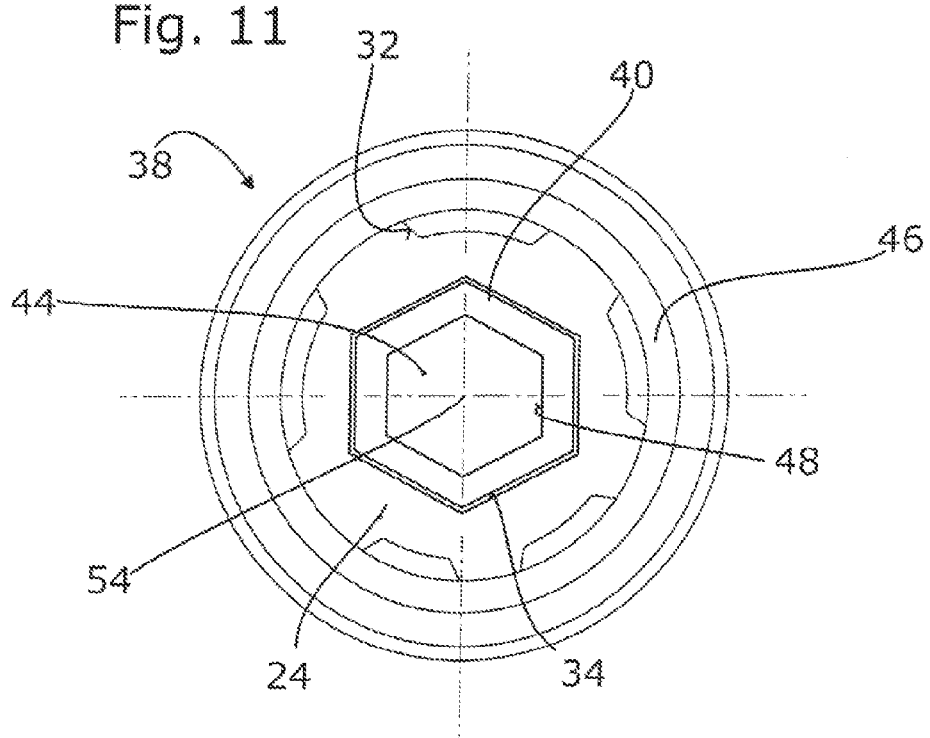
FIG. 11 shows a top view onto the free end portion of a screw part according to another embodiment.

In other embodiments, such as those shown in FIGS. 10 and 11, the hole 48 and/or the cross-section of the projection 44 are non-circular. In this case, any shape is conceivable, for example the shape of a toothed wheel, the shape of a polygon, an oval shape or the like. It is advantageous if only one configuration of the insert 40 has to be produced which can be used for all possible encoding arrangements and which can even be used when reversed. However, it is also possible to produce a special insert 40 for every encoding arrangement.

In the illustration according to FIGS. 2 and 3, the theft-protected screw part is completed. The projection 44 is deformed, both by a rivet head being formed which reaches over the upper edge of the insert 40 in a positive fit, and by the projection 44 being widened, now contacting the insert 40. As FIG. 2, in particular, shows, the inner stop face 34 is slightly shorter in the axial direction than the outer stop face 32. The two can also be offset relative to each other. This can in each case be done in the range of from 5% to 20% of the total axial length.

Figure 4:
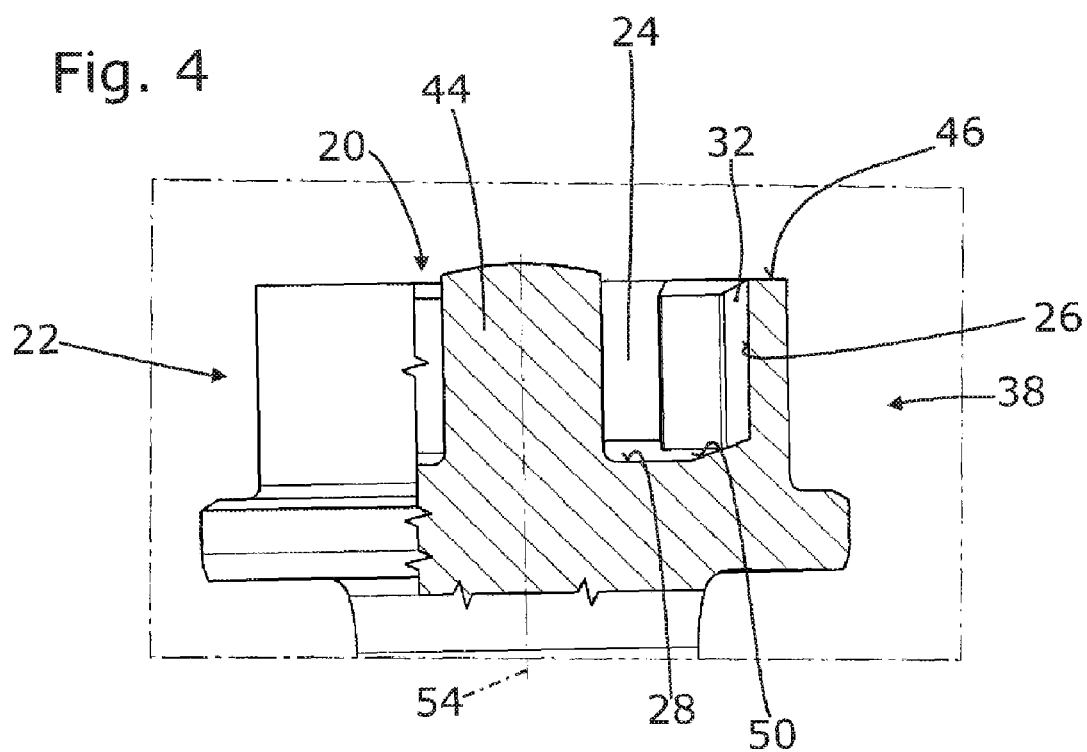
FIG. 4 shows a sectional view as in FIG. 2, but only for the main part and prior to joining the main part and the insert (not shown)
Figure 5:
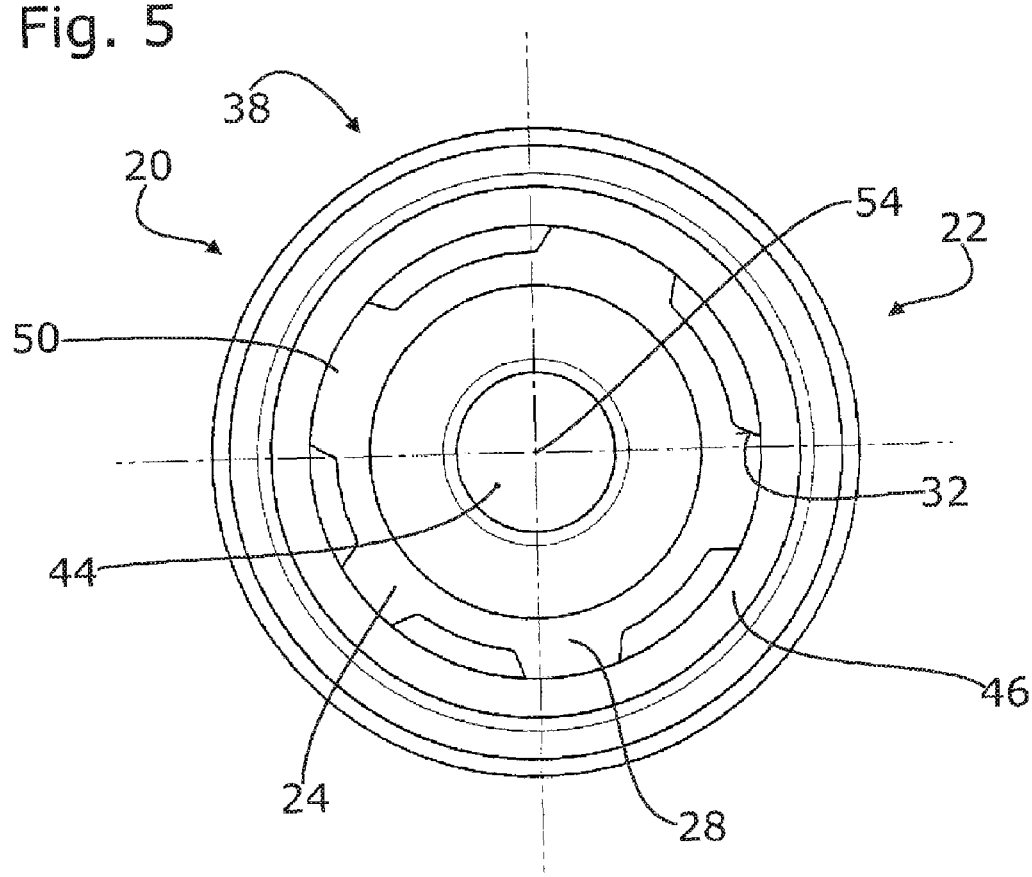
FIG. 5 shows a top view from above onto the free end portion of the main part according to FIG. 4.

The illustration according to FIGS. 4 and 5 only shows the main part 38 prior to joining, the insert 40 is not apparent from these two Figures. The cylindrical configuration of the undeformed projection 44 is apparent. The top of the projection has the shape of a round end. The projection is longer by about 10% of its total length than the corresponding dimension of the main part 38, i.e. the axial distance between the outer edge 46 and the bottom 28. A bevel 50 is provided in the bottom; the connection of the ring of the main part 38 forming the outer stop face 32 with the base area located thereunder is thereby improved.

Figure 6:
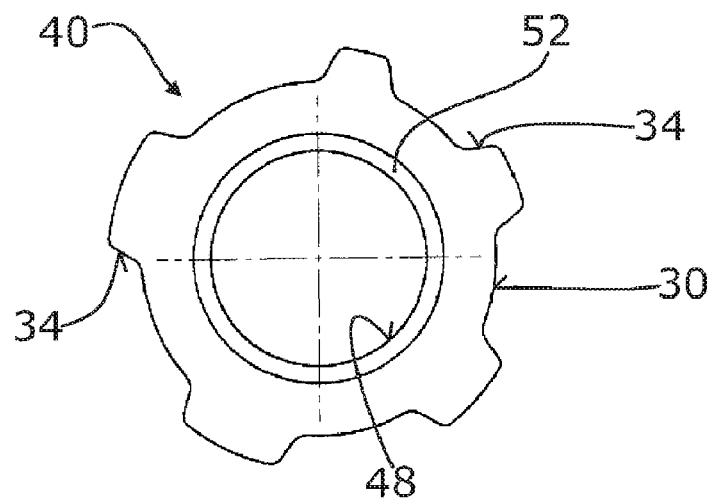
FIG. 6 shows a top view onto an insert prior to joining it to the main part.
Figure 7:
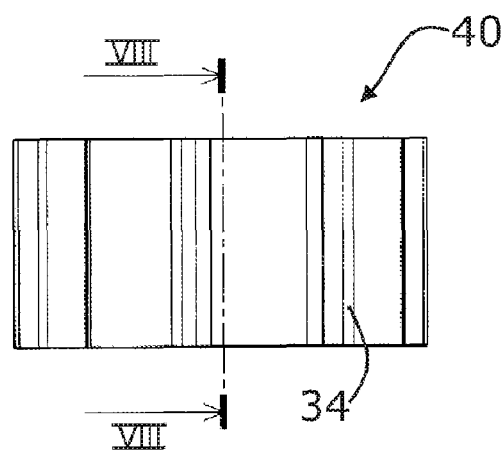
FIG. 7 shows a side view of the insert according to FIG. 6.
Figure 8:
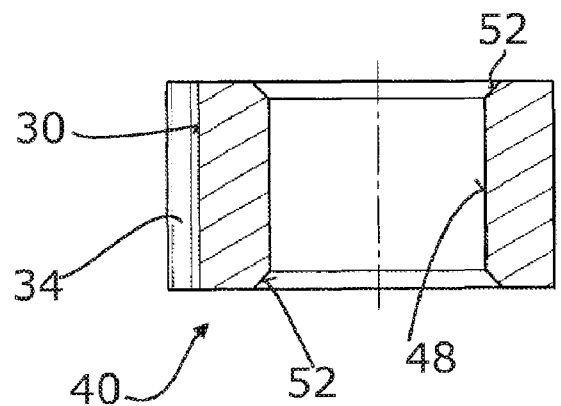
FIG. 8 shows a section along the line of cut VIII-VIII in FIG. 7.

FIGS. 6 to 8 show the insert 40 prior to being joined with the main part 38. The annular form of the insert 40 is apparent. The insert 40 can be formed as a stamped part, but may also be produced in a different way. The hole 48 of the insert 40 has a chamfer 52, preferably at both ends 48 of the hole. The deformed end portion of the projection 44 contacts this chamfer during riveting. The insert can be pushed onto the projection 44 in the axial direction in two different states, thereby obtaining different encoding arrangements when the inner stop face 34 is configured in a correspondingly unsymmetrical manner, as is shown in FIG. 6.

The wall thicknesses of the insert 40 and the cross-sectional dimensions of the projection 44 are dimensioned such that a sufficient mechanical strength is obtained. Preferably, the projection has cross-sectional dimensions of at least 2 mm, the wall thickness of the insert 40 in the radial direction is at least 1 mm.

The joining of the theft-protected screw part is shown in FIG. 9. An insert 40 configured as shown in FIGS. 6 to 8 is fitted in the axial direction (axis 54) onto a main part 38, as it is shown in FIG. 4. An auxiliary tool 36 is shown above this insert 40. It is configured to correspond with the cavity of the depression 24 and thus has a corresponding axial dimension, counter surfaces corresponding to the stop faces 32 and 34, etc. It could also be used as a wrench if it is connected with a corresponding lever. This tool 36 can be inserted axially prior or subsequent to inserting the insert 40. The alignment, that is, the angular position, of the two parts 38 and 40 relative to each other is fixed with the auxiliary tool 36.

A plunger 56 connected with a suitable press and acting in the axial direction is shown above the auxiliary tool 36. It deforms the projection 44 in such a way that a riveting and widening process occurs, so that the state according to FIG. 2 is finally reached.

What is claimed is:

1. Theft-protected screw part comprising one of a nut and screw having a main part including a projection and a free end portion with an annularly extending depression therein configured to engage a wrench to rotate the screw part, wherein the depression is limited by, from radially outward with respect to an axis of the screw part towards radially inward, an outer edge, a bottom, and an inner edge, wherein the outer edge forms outer stop faces and the inner edge forms inner stop faces configured to engage the wrench, wherein an annular insert forms the inner edge and inner stop faces and includes a hole receiving and gripping the projection.

2. Theft-protected screw part according to claim 1 wherein the projection is deformed at least on a free end thereof and extends over the insert.

3. Theft-protected screw part according to claim 1, wherein the projection has a radial dimension that is smaller than a radial dimension of the hole.

4. Theft-protected screw part according to claim 1 wherein the hole of the insert is one of cylindrical and non-circular.

5. Theft-protected screw part according to claim 1 wherein the projection has an axial length larger than an axial length of the insert.

6. Theft-protected screw part according to claim 5, wherein the axial length of the projection is larger than the axial length of the insert by at least 5%.

7. Theft-protected screw part according to claim 5, wherein the axial length of the projection is sufficiently larger than the axial length of the insert for riveting.

8. Theft-protected screw part according to claim 1 wherein the projection has cross-sectional dimensions of at least 2 mm.

9. Theft-protected screw part according to claim 1 wherein the insert is a stamped part.

10. Theft-protected screw part according to claim 1 wherein the insert is connected to the projection by at least one of a positive fit and frictional grip.

11. Theft-protected screw part according to claim 1 wherein the insert comprises two end surfaces and the insert can receive the projection with either surface oriented toward the bottom.

12. Theft-protected screw part according to claim 1 wherein the projection is mechanically deformed in such a way that it fills the hole of the insert in the deformed state.

13. Theft-protected screw part according to claim 1 wherein the insert has a wall thickness of at least 1 mm.

14. Theft-protected screw part according to claim 1 wherein the insert is non-circular.

15. Theft-protected screw part according to claim 14, wherein the insert and the projection each define a polygon having a number of sides "n" and the insert can be oriented relative to the projection in at least "n" different angular positions.

16. Method for producing a theft-protected screw part, the screw part comprising one of a nut and screw having a main part including a projection and a free end portion with an annularly extending depression therein configured to engage a wrench to rotate the screw part, wherein the depression is limited by, from radially outward with respect to an axis of the screw part towards radially inward, an outer edge, a bottom, and an inner edge, wherein the outer edge forms outer stop faces and the inner edge forms inner stop faces configured to engage the wrench, wherein an annular insert forms the inner edge and inner stop faces and includes a hole receiving and gripping the projection, the method for producing the screw part comprising: the insert is fitted onto the projection and is fixed using an auxiliary tool to deform the projection and the auxiliary tool is removed therefrom.

17. Method for producing a theft-protected screw part according to claim 16, wherein the auxiliary tool is identical in construction to the wrench.

18. Method for producing a theft-protected screw part according to claim 16, wherein the projection is deformed by at least one of widening and riveting thereof.

* * * * *